United States Patent
Iwashita et al.

(10) Patent No.: US 7,205,743 B2
(45) Date of Patent: Apr. 17, 2007

(54) CONTROLLER FOR MACHINE EFFECTING END

(75) Inventors: Yasusuke Iwashita, Fujiyoshida (JP); Yukio Toyozawa, Kumamoto (JP); Naoto Sonoda, Kumamoto (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/304,572

(22) Filed: Dec. 16, 2005

(65) Prior Publication Data

US 2006/0132078 A1 Jun. 22, 2006

(30) Foreign Application Priority Data

Dec. 16, 2004 (JP) ............... 2004-363939

(51) Int. Cl.
*G05B 19/416* (2006.01)

(52) U.S. Cl. ............... 318/568.18; 318/560; 318/432; 318/434

(58) Field of Classification Search ............ None
See application file for complete search history.

(56) References Cited

U.S. PATENT DOCUMENTS

| 5,371,451 | A | 12/1994 | Toyosawa et al. |
| 5,773,938 | A | 6/1998 | Seong et al. |
| 5,920,169 | A | 7/1999 | Hamamura et al. |
| 6,738,679 | B2 * | 5/2004 | Fujita et al. ............ 700/56 |
| 2006/0119307 | A1 * | 6/2006 | Kiyotani et al. ......... 318/632 |

FOREIGN PATENT DOCUMENTS

| EP | 1 443 372 | 1/2004 |
| EP | 1 441 270 | 7/2004 |
| JP | 4-323706 A | 11/1992 |
| JP | 06-091482 | 4/1994 |

OTHER PUBLICATIONS

European Search Report in corresponding Patent Application No. 05257723.6-2206 dated Apr. 25, 2006.

* cited by examiner

*Primary Examiner*—Lincoln Donovan
*Assistant Examiner*—Erick Glass
(74) *Attorney, Agent, or Firm*—Staas & Halsey LLP

(57) ABSTRACT

A controller for controlling a position of a driven element with respect to a machine effecting end so as to be in accord with a command. An acceleration sensor is mounted to a member of the machine effecting end to which a tool is attached. Acceleration detected by the sensor is subjected to second-order integration by a torsion estimator to obtain displacement $\Delta\theta$ of the machine effecting end from the original position. Position feedback P1 of a driven element is subtracted from position command Pc to obtain first position deviation $\epsilon 1$. The displacement $\Delta\theta$ is added to the first position deviation $\epsilon 1$ to obtain second position deviation $\epsilon 2$. The second position deviation $\epsilon 2$ is subjected to learning control of a learning controller to obtain a correction value, which is added to the first position deviation $\epsilon 1$ to obtain velocity command Vc. The second position deviation is the sum of the displacement $\epsilon 1$ of the driven element from the commanded position and the displacement $\Delta\theta$ of the machine effecting end relative to the driven element, and thus signifies a positional displacement of the machine effecting end from the commanded position. The second position deviation is subjected to the learning control so as to converge to "0", whereby the position of the driven element with respect to the machine effecting end becomes in accord with the command.

4 Claims, 3 Drawing Sheets

CONTROLLER FOR MACHINE EFFECTING END

BACKGROUND OF THE INVENTION

1. Field of the Invention

The present invention relates to a controller for controlling a machine tool, and more particularly to a position control of a driven element with respect to a machine effecting end in the machine tool.

2. Description of Related Art

In machine tools, to control the position and velocity of a driven element driven by a servomotor, position feedback control and velocity feedback control as well as current feedback control are usually performed so that the position and velocity of the driven element may be in accord with the commanded position and velocity.

Even while such position, velocity and current feedback controls are performed, the driven element is liable to vibrate when the acceleration of the servomotor suddenly changes. To avoid this, a control method has been proposed wherein an acceleration sensor for detecting the acceleration of a driven element is provided, a signal output from the acceleration sensor is subtracted from a current command derived by the velocity feedback control, and the difference obtained is used as a current command for the current feedback control. Specifically, when the driven element vibrates, the vibration component contained in the acceleration signal indicative of the acceleration of the driven element detected by the acceleration sensor constitutes an error with respect to the current command for the current feedback control. Accordingly, the vibration component is subtracted from the current command to remove the error, and using the difference obtained, the driving current for the servomotor is controlled to suppress the vibration (see JP06-91482A).

Also, learning control is adopted when machining a pattern repeated at predetermined intervals, wherein the amount of position deviation is made to converge to the vicinity of zero to enable higher-precision machining (see JP06-309021A and JP04-323706A).

FIG. 6 is a block diagram of a learning controller for performing the conventional learning control. In each position loop processing interval, a position feedback value P1 is subtracted from a position command Pc to obtain a position deviation $\epsilon$, to which is added a correction value x obtained in the immediately preceding interval of the repeated pattern, and the result is filtered by a band-limiting filter 22a and stored in a delay element memory 22b. The delay element memory 22b includes a memory element for storing the correction value x corresponding to one interval of the repeated pattern and, in each position loop processing interval, outputs the correction value x obtained in the immediately preceding position loop processing interval of the repeated pattern. The output correction value is compensated for a phase lag and gain drop of the controlled system by a dynamic characteristic compensation element 22c and then is added to the position deviation $\epsilon$. The sum obtained is multiplied by a position gain 21, and the result is output as a velocity command Vc.

Thus, in the learning control, the correction value x stored in the immediately preceding position loop processing interval of the repeated pattern is added to the position deviation $\epsilon$, and the velocity command Vc obtained based on the thus-corrected position deviation is output to the velocity control section. The learning control is repeatedly executed to make the position deviation $\epsilon$ converge to "0".

In general, the driven element driven by the servomotor is controlled to move with respect to a machine effecting end at which a tool for effecting machining in contact with a workpiece is fixedly provided in the machine tool, and the relative position, velocity, etc. of the driven element with respect to the machine effecting end is controlled. Thus, with a detector mounted to the driven element, the servomotor for driving the driven element is subjected to position, velocity and current loop controls to control the position and velocity of the driven element, and further the aforementioned learning control is executed to make the position deviation converge to "0", whereby the driven element can be made to move as commanded.

However, in the case of a machine tool of which the rigidity between the driven element and the machine effecting end is low, the motion of the driven element with respect to the machine effecting end do not always agree with commanded motion. Further, in cases where a machine tool which is required to perform high-speed, high-precision machining is operated at high acceleration, positional displacement between the driven element and the machine effecting end caused due to torsion or the like occasionally becomes so large that it cannot be neglected, even if the machine rigidity is relatively high.

In JP06-91482A, in order to suppress vibration of the driven element, an acceleration sensor is mounted to the driven element, and based on the acceleration detected by the acceleration sensor, the current command is corrected to suppress the vibration. Thus, the disclosed technique is intended to suppress vibration and thereby stabilize machining, and not to make the motion of the driven element with respect to the machine effecting end in accord with the command.

SUMMARY OF THE INVENTION

The present invention provides a controller capable of controlling relative motion of a driven element driven by a motor with respect to a machine effecting end of a machine tool to be in accordance with a command to the controller.

A controller of the present invention has a position control section and a velocity control section for respectively controlling position and velocity of a motor, to control relative motion of a driven element driven by the motor with respect to a machine effecting end of a machine tool. According to an aspect of the invention, the controller comprises: position detecting means for detecting a position of the motor or the driven element; means for obtaining a first position deviation between a position command for the motor and the position of the motor detected by the position detecting means; acceleration detecting means for detecting an acceleration of the machine effecting end; conversion means for determining a position of the machine effecting end by converting the acceleration detected by the acceleration detecting means; means for obtaining a second position deviation by adding the obtained first position deviation and the determined position of the machine effecting end; and learning control means for calculating and outputting a correction value for converging the second position deviation to zero, wherein the correction value is added to the first position deviation and the sum obtained is multiplied by a position gain and the product obtained is outputted to the velocity control section as a velocity command. The position obtained by converting the acceleration of the machine effecting end by the conversion means may be subjected to filtering by a high-pass filter.

According to another aspect of the present invention, the controller comprises: position detecting means for detecting the position of the motor or the driven element; means for obtaining a first position deviation between a position command for the motor and the position of the motor detected by the position detecting means; velocity detecting means for detecting the velocity of the motor or the driven element; estimating means for estimating an amount of torsion of the machine effecting end based on the velocity detected by the velocity detecting means and a torque command outputted from the velocity control section; means for obtaining a second position deviation by adding the obtained first position deviation and the estimated amount of torsion; and learning control means for calculating and outputting a correction value for converging the second position deviation to zero, wherein the correction value is added to the first position deviation, the sum obtained is multiplied by a position gain and the product obtained is outputted to the velocity control section as a velocity command. The torsion amount of the machine effecting end estimated by the estimating means may be subjected to filtering by a high-pass filter.

Thus, an amount of positional displacement of the machine effecting end to which a tool is attached is detected, and the position of the machine effecting end, inclusive of the displacement, is controlled by the learning control so as to coincide with the commanded position. Consequently, even in the case where the machine rigidity is low and thus positional displacement between the driven element driven by the motor and the machine effecting end is caused due to strain or torsion, such displacement can be corrected, enabling the machine effecting end to move as commanded. Also, where a machine tool is required to perform high-speed, high-precision machining and thus even slight positional displacement between the driven element driven by a motor and the machine effecting end attributable to strain or torsion should not be overlooked, it is possible to carry out high-speed, high-precision machining satisfactorily.

DETAILED DESCRIPTION

Figure 1:
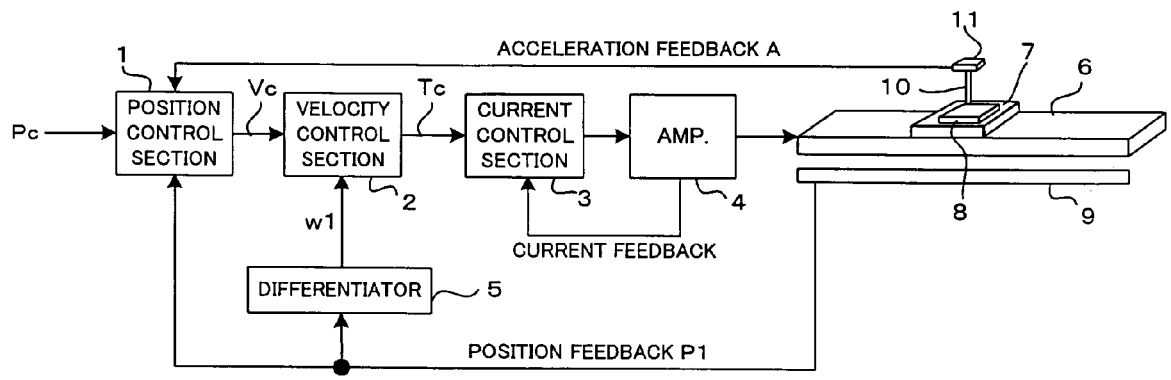
FIG. 1 is a block diagram showing a principal part of a first embodiment of the present invention.

FIG. 1 is a block diagram showing a principal part of a first embodiment of the present invention. In the first embodiment, an acceleration sensor is mounted to a member at a machine effecting end where a tool or the like actually disposed into contact with a workpiece to be machined is attached. Based on the acceleration detected by the acceleration sensor, positional displacement of the member to which the tool is attached is obtained and corrected so that the tool may move as commanded.

In the illustrated embodiment, a linear motor is used as a servomotor for driving a driven element, by way of example. In FIG. 1, a workpiece 8 to be machined is attached to the driven element 7 which is driven by the linear motor 6. An acceleration sensor 11 is attached to a member 10 which is a machine effecting end to which a tool such as a cutter for effecting machining on the workpiece is attached. The relative position of the workpiece 8 (the driven element 7) with respect to the machining effecting end is commanded by a machining program to be controlled for machining the workpiece 8 by the tool. A position detector 9 for detecting the position of the driven element 7 is mounted to the linear motor 6.

A controller for controlling the linear motor 6 comprises position, velocity and current control sections for performing position, velocity and current feedback controls by means of a processor etc., like conventional motor controllers. In this embodiment, the position control section is configured differently, compared with conventional controllers.

First, the controller will be outlined. The position control section 1 performs a position feedback control process, learning control, etc. based on a position command Pc output from a host controller and a position feedback P1 from the position detector 9, and in this embodiment, further based on an acceleration feedback A from the acceleration sensor 11, to obtain a velocity command Vc, which is output to the velocity control section 2. The velocity control section 2 performs a velocity loop control process similar to a conventional one, based on the velocity command Vc from the position control section 1 and a velocity feedback w1 obtained by a differentiator 5 by differentiating the position feedback P1 from the position detector 9, to obtain a torque command (current command) Tc.

The current control section 3 performs current loop control based on the torque command Tc from the velocity control section 2 and a current feedback fed back from a current detector, not shown, to drive the linear motor 6 through an amplifier 4, as in conventional controllers. In the controller for controlling the linear motor 6, the position control section 1 differs in configuration from a conventional position control section while the velocity control section 2, the current control section 3, etc. are configured in the same manner as in conventional controllers.

Figure 2:
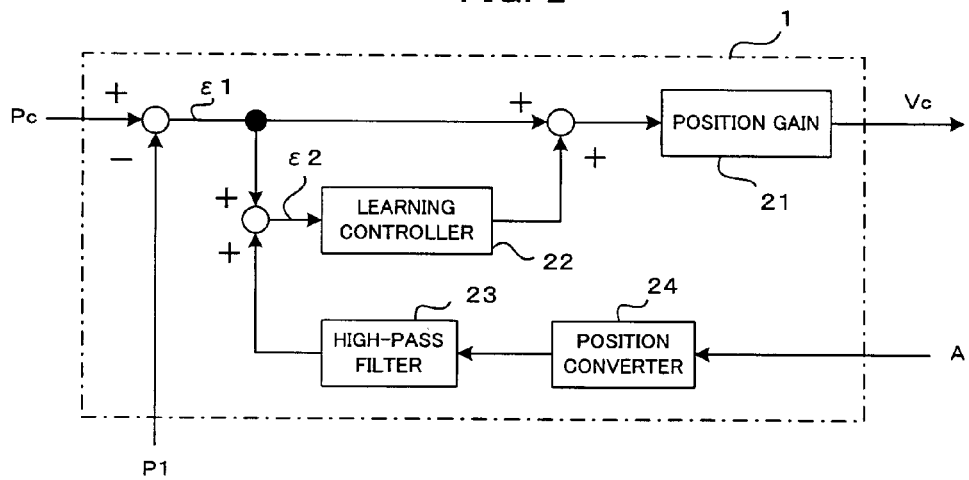
FIG. 2 is a block diagram showing in detail a position control section of the first embodiment.

FIG. 2 is a block diagram showing details of the position control section 1. The position control section 1 differs from a conventional position control section in that it is provided with a learning controller 22, a high-pass filter 23, and a position converter 24. The acceleration feedback A fed back from the acceleration sensor 11 is subjected to second-order integration in the position converter 24, to obtain a positional displacement of the machine effecting end (member 10 at the machine effecting end which is a final control point of the machine tool). The machine effecting end member 10 is fixed to the machine tool, and therefore, the position thereof remains unchanged. However, in cases where the rigidity between the driven element 7 and the member 10 of the machine effecting end is low, the machine effecting end is displaced from the original position. Also, where high-speed, high-precision machining is required, even a slight positional displacement affects the machining accuracy. Thus, the positional displacement is obtained by subjecting the acceleration detected by the acceleration sensor 11 to second-order integration.

On the other hand, the position feedback value P1 from the position detector 9 is subtracted from the position command Pc supplied from the host controller to obtain a position deviation ∈1, as in the conventional position loop control process. The position deviation ∈1 will be hereinafter referred to as the first position deviation. The first position deviation ∈1 is added to a value which is obtained by passing the positional displacement amount obtained by the position converter 24 through the high-pass filter 23 for extracting a disturbance component, to obtain a second position deviation ∈2, which is input to the learning controller 22. Then, the output of the learning controller 22 and the first position deviation ∈1 are added together to correct the first position deviation ∈1, and the corrected position deviation is multiplied by a position gain 21 to obtain a velocity command Vc as the output of the position control section 1.

The first position deviation ∈1 is indicative of a positional displacement of the driven element (motor) 7 with respect to the position command Pc. On the other hand, the positional displacement obtained by the position converter 24 is a displacement of the member 10 of the machine effecting end from the original position and is indicative of an amount of displacement caused by strain or torsion of the machine tool. The second position deviation ∈2 is the sum of these two displacement amounts, namely, the positional displacement of the driven element 7 with respect to the position command Pc and the positional displacement of the machine effecting end with respect to the driven element, and therefore is indicative of an amount of positional displacement of the machine effecting end with respect to the commanded position. Accordingly, by causing the second position deviation ∈2 to converge to "0", it is possible to make the position of the machine effecting end coincide with the commanded position for the driven element 7, that is, the workpiece 8 fixed to the driven element 7. In this embodiment, therefore, the learning control is performed to make the second position deviation ∈2 converge to "0".

Figure 6:
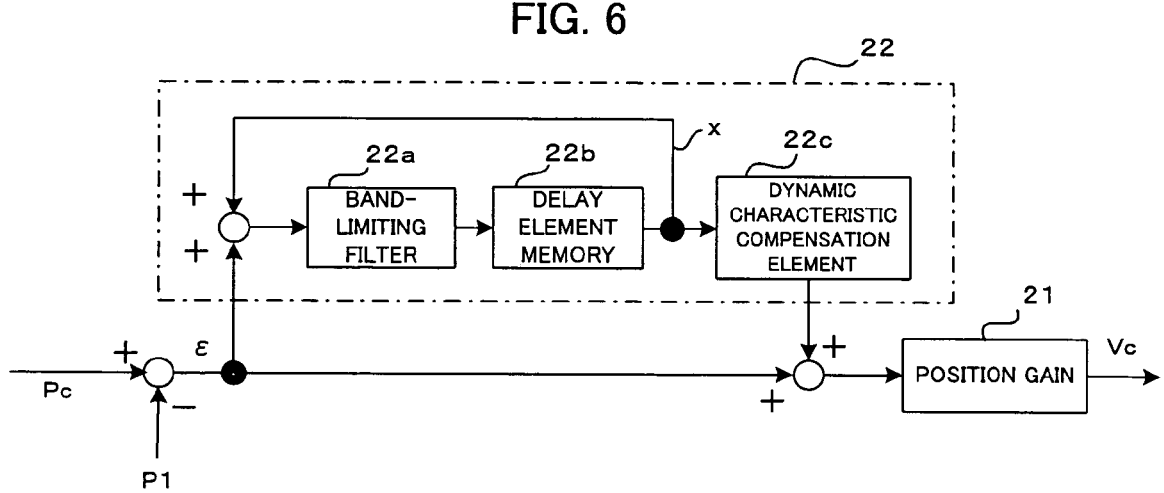
FIG. 6 is a block diagram of a learning controller.

The learning controller 22 has a configuration identical to that of the conventional learning controller shown in FIG. 6 and comprises the band-limiting filter 22a, the delay element memory 22b and the dynamic characteristic compensation element 22c. The only difference between the learning controller 22 and the conventional learning controller resides in that the learning controller 22 is input with the second position deviation ∈2 and that the output therefrom is added to the first position deviation ∈1.

According to the first embodiment, in each position loop control interval, the second position deviation ∈2 is added to the correction value x stored in the immediately preceding position loop interval of the pattern repeated at predetermined intervals, and the sum obtained is filtered through the band-limiting filter 22a for stabilizing the controlled system and then stored in the delay element memory 22b as the correction value x of the present position loop control interval. Also, the correction value x of the immediately preceding position loop interval of the repeated pattern, stored in the delay element memory 22b, is compensated for a phase lag and gain drop of the controlled system by the dynamic characteristic compensation element 22c, and the result is output from the learning controller 22. In the position control section 1, the first position deviation ∈1 and the output of the learning controller 22 are added together, and the sum obtained is multiplied by the position gain 21, the result being output as the velocity command Vc.

Thus, the second position deviation ∈2 is controlled so as to converge to "0" by the learning control of the learning controller 22, whereby the position of the machine effecting end (member 10) can be made to be in accord with the position command Pc, enabling high-precision machining.

Figure 3:
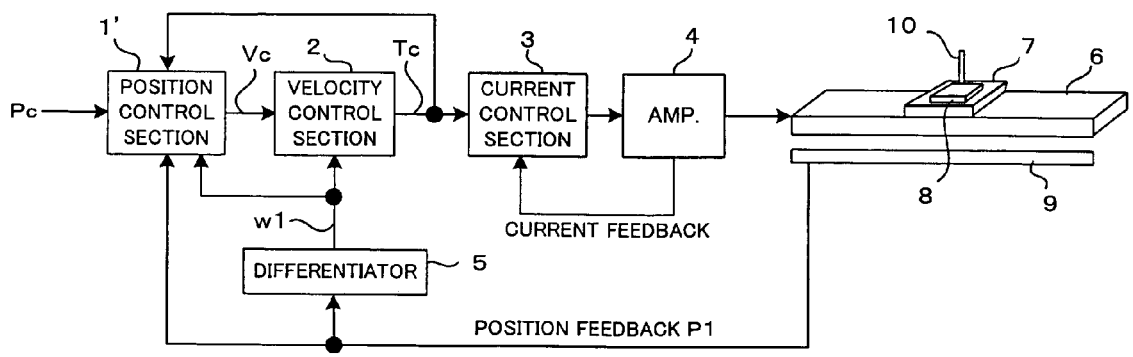
FIG. 3 is a block diagram showing a principal part of a second embodiment of the present invention.

FIG. 3 is a block diagram showing a principal part of a second embodiment of the present invention.

In the second embodiment, the acceleration sensor is not used. Instead, the position of the machine effecting end is predicted by using a machine model and is controlled so as to coincide with the commanded position. First, the principle of operation of the second embodiment will be explained.

Where the relationship of the position detector and the machine effecting end is represented as a two-inertia system with the friction term neglected, the following equations (1) and (2) hold with respect to the motor side and the machine side, respectively:

$$J1 \cdot w1 \cdot s = Tm - \frac{k(w1 - w2)}{s} \qquad (1)$$

$$J2 \cdot w2 \cdot s = \frac{k(w1 - w2)}{s} + Td \qquad (2)$$

In the above equations (1) and (2), J1 is the motor inertia, J2 is the machine inertia, w1 is the motor velocity, w2 is the velocity of the machine effecting end, k is the spring constant of the machine, Tm is the commanded torque, Td is the disturbance torque, and s is the complex variable of Laplace transform.

Also, provided the position of the motor is P1 and the position of the machine effecting end corresponding to the motor position P1 is P2, then a torsion amount $\Delta\theta$ is given by the following equation (3):

$$\Delta\theta(s) = P1 - P2 \qquad (3)$$
$$= \frac{w1 - w2}{s}$$
$$= \frac{Tm - J1 \cdot w1 \cdot s}{k}$$

The equation (3) includes a derivative term, and if derivative action is performed, then noise in the high-frequency band becomes uncontrollable. Accordingly, a stabilizing filter is added, then the following equation (4) is derived:

$$\Delta\theta(s) = \frac{Tm - J1 \cdot w1 \cdot s}{k} \cdot \frac{1}{\tau \cdot s + 1} \qquad (4)$$
$$= \frac{Tm}{k(\tau \cdot s + 1)} - \frac{J1 \cdot w1}{k \cdot \tau}\left(1 - \frac{1}{\tau \cdot s + 1}\right)$$

For discretization, a conventional form of low-pass filter is used. The filter f(s)=1/(τ·s+1) can be expressed by the following equation (5):

$$F(z) = \frac{1-v}{1-v \cdot z^{-1}} \quad (5)$$

In the equation (5), γ=exp(-t/τ), where t is the sampling interval. Consequently, the torsion amount Δθ is given by the following equation (6):

$$\Delta\theta(z) = \frac{Tm}{k} \cdot F(z) - \frac{J1 \cdot w1}{k \cdot \tau}(1 - F(z)) \quad (6)$$

In the above equation (6), the torque command Tm is expressed using a unit of force and is an unobservable physical quantity. Thus, provided the torque constant is kt, then the torque command Tc output from the current control section and the torque command Tm are in the following relationship:

$$Tm = kt \cdot Tc$$

The equation (6) is expressed using the torque command Tc which is observable, then the following equation (7) is derived:

$$\Delta\theta(z) = \left[ kt \cdot Tc \cdot F(z) - \frac{J1 \cdot w1}{\tau}(1 - F(z)) \right] \cdot \frac{1}{k} \quad (7)$$

Figure 5:
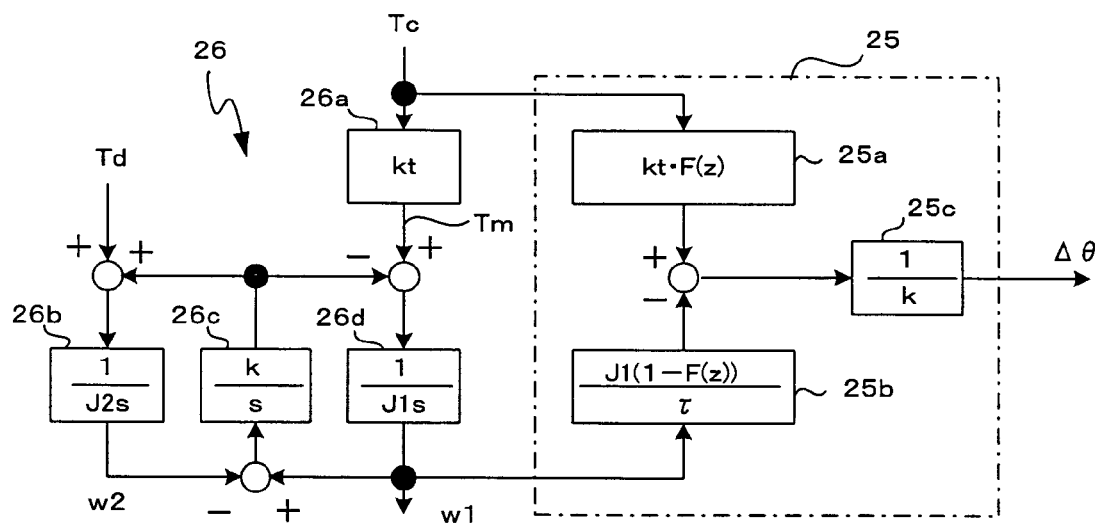
FIG. 5 is a block diagram showing a machine model and a torsion estimator of the second embodiment.

FIG. 5 is a block diagram illustrating the relationships of the aforementioned equations (1) through (7), wherein the part indicated by reference numeral 26 corresponds to the motor and machine models expressed by the equations (1) and (2), respectively, and reference numeral 25 denotes a torsion estimator, described later, by means of which the torsion amount Δθ is obtained.

FIG. 3 is a block diagram illustrating the principal part of the second embodiment. The second embodiment differs from the first embodiment in the omission of the acceleration sensor as well as in the configuration of the position control section. Also, compared with conventional motor controllers, the position control section of the second embodiment is configured differently while the velocity control section, the current control section, etc. are configured in the same manner.

The position control section 1' obtains a velocity command Vc based on the position command Pc output from the host controller, the position feedback P1 detected by and fed back from the position detector 9, the velocity feedback w1 obtained by the differentiator 5 by differentiating the position feedback P1 and the torque command Tc output from the velocity control section 2, and outputs the obtained velocity command Vc to the velocity control section 2. The velocity control section 2 performs a velocity loop control process in the same manner as in conventional controllers, based on the velocity command Vc from the position control section 1' and the velocity feedback w1 obtained by the differentiator 5 by differentiating the position feedback P1 from the position detector 9, to obtain a torque command (current command) Tc.

The current control section 3 performs current loop control in the same manner as in conventional controllers, based on the torque command Tc from the velocity control section 2 and the current feedback fed back from the current detector, not shown, to drive the linear motor 6 through the amplifier 4.

Figure 4:
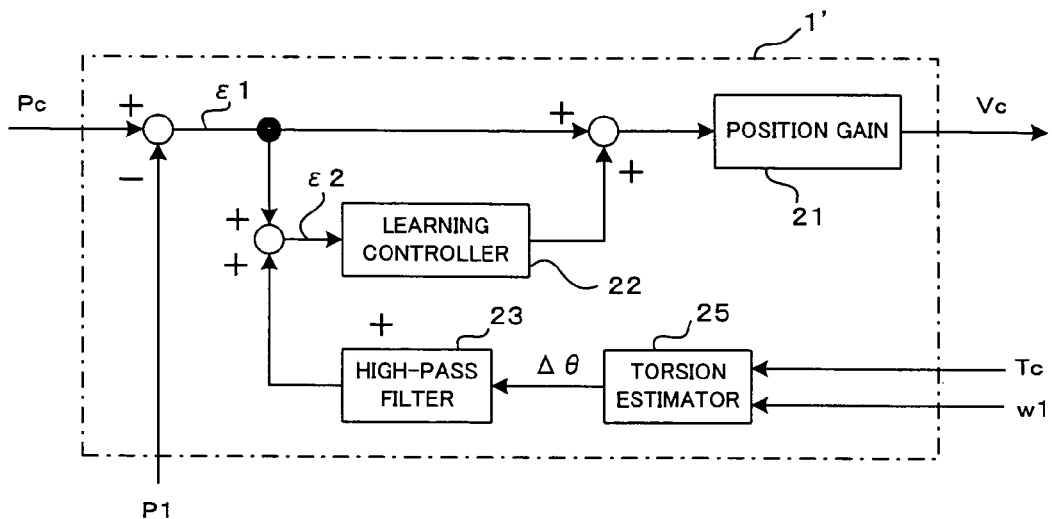
FIG. 4 is a block diagram showing in detail a position control section of the second embodiment.

FIG. 4 is a block diagram showing details of the position control section 1' according to the second embodiment. The position control section 1' of the second embodiment differs from the position control section 1 of the first embodiment in that the torsion estimator 25 is used in place of the position converter 24.

The torsion estimator 25 performs the calculation indicated by the aforementioned equation (7), and the part enclosed by the broken line in the block diagram of FIG. 5 corresponds to the process performed by the torsion estimator 25. Specifically, the torque command Tc output from the velocity control section 2 is filtered by the filter (F(z)), and the filtered value is multiplied by the torque constant kt (the result being the output of the term 25a). Also, the velocity feedback w1, which has been obtained by the differentiator 5 by differentiating the position feedback from the position detector 9, is filtered by the filter (F(z)), the filtered value is subtracted from "1", the difference obtained is multiplied by the time constant τ of the filter, and the motor inertia J1 is divided by the obtained product (the result being the output of the term 25b). The value obtained by the calculation of the term 25b is subtracted from the value obtained by the calculation of the term 25a, and the difference obtained is multiplied by the reciprocal (1/k) of the spring constant (term 25c) to obtain the torsion amount Δθ. The torsion amount Δθ obtained in this manner is output through the high-pass filter 23 for extracting a disturbance component.

On the other hand, the position feedback P1 from the position detector 9 is subtracted from the position command Pc from the upper-level controller, to obtain the first position deviation ε1. Then, the first position deviation ε1 is added to the torsion amount Δθ which has been filtered by the high-pass filter 23, to obtain the second position deviation ε2. Using the second position deviation ε2 as the input to the learning controller 22, the learning control is performed. The process performed by the learning controller 22 in each processing interval is substantially identical with that performed by the learning controller shown in FIG. 6, as well as with the process explained with reference to the first embodiment. The only difference lies in that the learning controller 22 is input with the second position deviation ε2 which is obtained by adding together the first position deviation ε1 and the torsion amount Δθ.

The learning control is thus performed by the learning controller 22. The correction value output from the learning controller 22 is added to the first position deviation ε1, and the sum obtained is multiplied by the position gain 21, the resultant product being output from the position control section 1' to the velocity control section 2 as the velocity command Vc.

As seen from the equation (3), the torsion amount Δθ estimated by the torsion estimator 25 indicates the difference between the motor position P1 and the position P2 of the machine effecting end (position of the member 10 to which a tool or the like is attached). In the case where the machine has high rigidity and is in an ideal state, the torsion amount Δθ indicative of the above position difference is "0". However, where high-speed, high-precision machining is required, the torsion amount Δθ is not negligible, and where the machine has low rigidity, the torsion amount Δθ is significantly large.

Accordingly, the torsion amount Δθ is added to the first position deviation ε1, whereby the second position deviation ε2, which indicates the difference between the position command Pc and the position P2 of the machine effecting end, inclusive of the torsion amount Δθ, is obtained as indicated by the following equation (8):

$$\epsilon 2 = \epsilon 1 + \Delta\theta = Pc - P1 + P1 - P2 = Pc - P2 \quad (8)$$

The learning control is performed so that the second position deviation ε2 may become "0", and consequently, the difference between the position command Pc and the position P2 of the machine effecting end is controlled so as to become "0". Thus, even in the case where the machine undergoes a torsion of Δθ, the position P2 of the machine effecting end is controlled so as to be in accord with the position command Pc, permitting high-precision machining.

In the above embodiments, a linear motor is used as the motor for driving the driven element, but a rotary motor may be used instead. Also, for the position feedback, the present invention can be applied to either semi-closed loop control wherein the motor position detected by a motor position detector is fed back as the position feedback, or fully-closed loop control wherein the position of a driven element driven by the motor is fed back as the position feedback. Further, a detector for detecting the velocity of the motor or the driven element may be used in place of the differentiator 5.

FIGS. 7 to 9 illustrate the results of simulation conducted in order to ascertain the effects achieved by the present invention. For the simulation, a synchronous motor was used as the motor, and the machine inertia J2 was set equal to the motor inertia J1 (0.228 kgfcm$^2$). As for the spring constant k, the resonance frequency was set to 100 Hz and the velocity band to 20 Hz (the spring constant is determined by the inertia and the resonance frequency). Using the rotary motor, a position command Pc providing a velocity command of 300 rpm was input with the position gain set to 30/s, the disturbance torque set to 50 kgf with a 5-Hz sine wave, and the learning band set to 50 Hz, to perform the simulation while controlling the motor in semi-closed loop wherein the position of the rotary motor was detected and fed back.

Figure 7A:
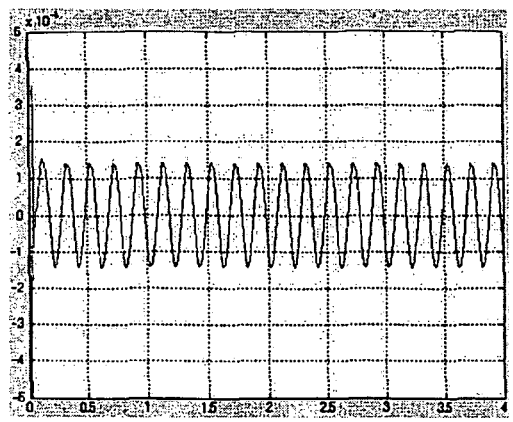
FIGS. 7a and 7b are graphs showing the results of simulation of the motor position relative to a commanded position and the position of a machine effecting end, wherein position and velocity feedback controls were performed in semi-closed loop with no learning control performed.
Figure 7B:
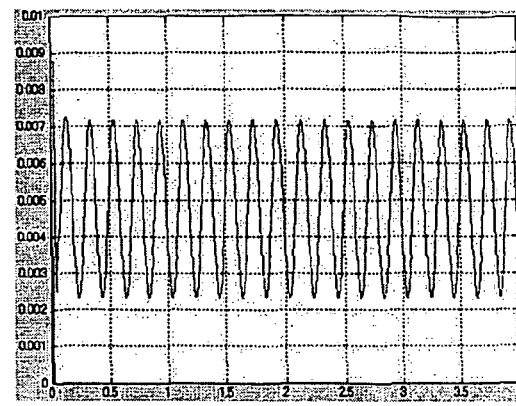

FIGS. 7*a* and 7*b* illustrate the case where conventional position and velocity loop controls were executed while no learning control was performed. FIG. 7*a* shows the position deviation, namely, the deviation of the motor position from the commanded position observed during the semi-closed loop control, and FIG. 7*b* shows the position deviation of the machine effecting end with respect to the position command. As illustrated, both the motor position and the position of the machine effecting end are influenced by disturbance, making the position deviations fail to converge.

Figure 8A:
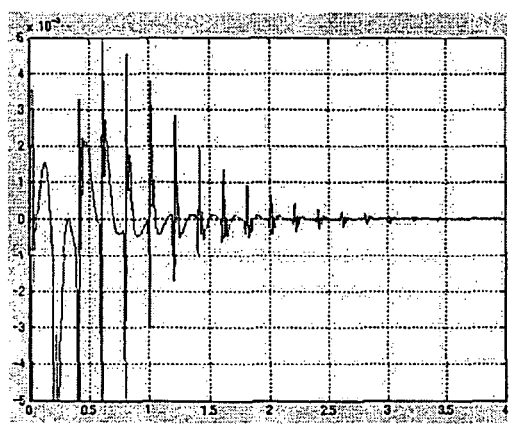
FIGS. 8a and 8b are graphs showing the results of simulation of the motor position relative to a commanded position and the position of the machine effecting end, wherein position and velocity feedback controls were performed in semi-closed loop with the learning control performed.
Figure 8B:
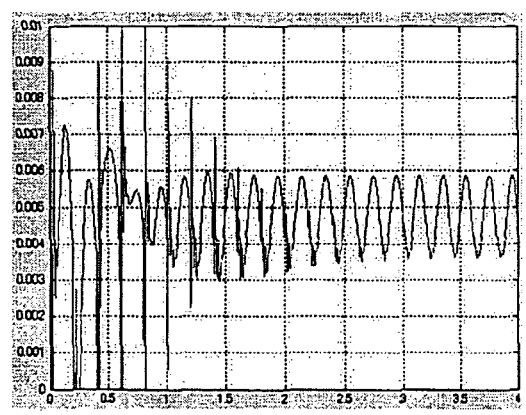

FIGS. 8*a* and 8*b* illustrate the case where conventional learning control was performed. FIG. 8*a* shows the motor position deviation (deviation of the motor position from the commanded position) observed during the semi-closed loop control, and FIG. 8*b* shows the position deviation of the machine effecting end with respect to the position command. As seen from the figures, the motor position deviation converges but the position deviation of the machine effecting end does not.

Figure 9A:
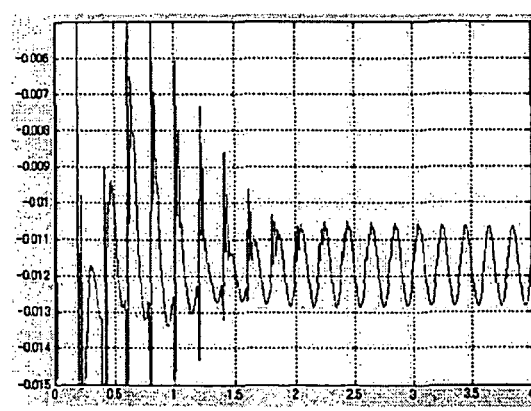
FIGS. 9a and 9b are graphs showing the results of simulation of the motor position relative to a commanded position and the position of the machine effecting end, wherein position and velocity feedback controls were performed in semi-closed loop with the second embodiment of the invention applied.
Figure 9B:
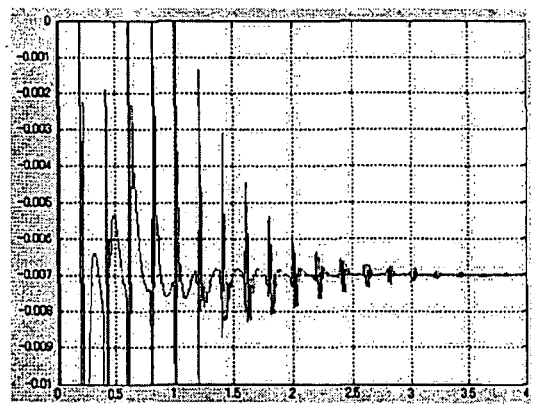

FIGS. 9*a* and 9*b* illustrate the case where the second embodiment of the present invention was applied (however, a rotary motor was used as the motor). FIG. 9*a* shows the motor position deviation (deviation of the motor position from the commanded position) observed during the semi-closed loop control, and FIG. 9*b* shows the position deviation of the machine effecting end with respect to the position command. As illustrated, although the motor position deviation does not converge, the position deviation of the machine effecting end, which is to be ultimately controlled, converges.

What is claimed is:

1. A controller having a position control section and a velocity control section for respectively controlling position and velocity of a motor, to control relative motion of a driven element driven by the motor with respect to a machine effecting end of a machine tool, said controller comprising:
    position detecting means for detecting a position of the motor or the driven element;
    means for obtaining a first position deviation between a position command for the motor and the position of the motor detected by said position detecting means;
    acceleration detecting means for detecting an acceleration of the machine effecting end;
    conversion means for determining a position of the machine effecting end by converting the acceleration detected by said acceleration detecting means;
    means for obtaining a second position deviation by adding the obtained first position deviation and the determined position of the machine effecting end; and
    learning control means for calculating and outputting a correction value for converging the second position deviation to zero,
    wherein the correction value is added to the first position deviation and the sum obtained is multiplied by a position gain and the product obtained is outputted to the velocity control section as a velocity command.

2. A controller according to claim 1, wherein the position obtained by converting the acceleration of the machine effecting end by said conversion means is subjected to filtering by a high-pass filter.

3. A controller having a position control section and a velocity control section for respectively controlling position and velocity of a motor, to control relative motion of a driven element driven by the motor with respect to a machine effecting end of a machine tool, said controller comprising:
    position detecting means for detecting the position of the motor or the driven element;
    means for obtaining a first position deviation between a position command for the motor and the position of the motor detected by said position detecting means;
    velocity detecting means for detecting the velocity of the motor or the driven element;
    estimating means for estimating an amount of torsion of the machine effecting end based on the velocity detected by said velocity detecting means and a torque command outputted from the velocity control section;
    means for obtaining a second position deviation by adding the obtained first position deviation and the estimated amount of torsion; and
    learning control means for calculating and outputting a correction value for converging the second position deviation to zero,
    wherein the correction value is added to the first position deviation, the sum obtained is multiplied by a position gain and the product obtained is outputted to the velocity control section as a velocity command.

4. A controller according to claim 3, wherein the torsion amount of the machine effecting end estimated by said estimating means is subjected to filtering by a high-pass filter.

* * * * *